United States Patent [19]

Wyden

[11] 4,010,020

[45] Mar. 1, 1977

[54] APPARATUS FOR FORMING CURVED SURFACES BY ROTATION

[76] Inventor: Stephen Wyden, 16 Court St., Brooklyn, N.Y. 11241

[22] Filed: Dec. 18, 1973

[21] Appl. No.: 425,901

Related U.S. Application Data

[63] Continuation-in-part of Ser. No. 70,298, Sept. 3, 1970, abandoned.

[52] U.S. Cl. ..................... 65/142; 65/71; 65/302; 425/3; 425/128; 164/146; 164/255; 164/289

[51] Int. Cl.² .................. C03B 19/04; C03B 13/14

[58] Field of Search .......... 65/302, 71, 142; 425/3, 425/128; 164/255, 289, 146

[56] References Cited

UNITED STATES PATENTS

| 793,299 | 6/1905 | Jewett | 65/302 X |
|---|---|---|---|
| 2,543,303 | 2/1951 | Rubissow | 65/302 X |
| 2,961,703 | 11/1960 | Pinotti | 65/302 X |
| 2,972,524 | 2/1961 | Ross | 164/289 X |
| 3,010,153 | 11/1961 | Bittnek | 65/302 X |
| 3,164,654 | 1/1965 | Spencer | 65/302 X |
| 3,220,102 | 11/1965 | Lieberman et al. | 65/302 X |
| 3,474,165 | 10/1969 | Rakes et al. | 264/312 |
| 3,528,133 | 9/1970 | Morse | 65/302 X |
| 3,818,974 | 6/1974 | Eberle | 65/302 X |

FOREIGN PATENTS OR APPLICATIONS

| 23,348 | 11/1929 | Australia | 65/302 |
|---|---|---|---|
| 634,847 | 2/1928 | France | 65/302 |
| 80,344 | 4/1895 | Germany | 65/302 |

*Primary Examiner*—Robert L. Lindsay, Jr.
*Assistant Examiner*—Frank W. Miga

[57] ABSTRACT

Conoid surfaces can be generated by rotation of a material at different angles and under differing constraints. An axis of 45° can produce hyperboloids; with perpendicular axes, concentric spheres can be produced; magnetic fields can be used to shape the lenses; and multielement lenses can be produced with special chambers.

8 Claims, 5 Drawing Figures

INVENTOR
S. WYDEN
By

APPARATUS FOR FORMING CURVED SURFACES BY ROTATION

This application is a continuation-in-part of the co-pending application Ser. No. 70,298 filed on Sept. 3, 1970, now abandoned, and is entitled to the earlier filing date for the common subject matter.

This application concerns methods of producing lenses of which much is known. Curved surfaces of revolution have been produced by grinding, spinning, and by application of unequal pressures to the surface. This application concerns processes of generating curvatures in one or more surfaces of a material wherein at least one of the steps involves spinning and through wich process the type and degree of curvature of the surface is under the control of the operator.

Spinning, as a means of modifying a mass of molten material previous to and during congealing to a solid is well known in the art, and has been used to fill molds effectively, to order the distribution of the molecules of a mass or object, and to generate paraboloid surfaces. Methods of spinning are known that use one axis and those that use a plurality of axes: wherein the axes intersect, within, or without the rotating mass. However, the prior art in spinning optical surfaces restricts the flow to two conditions: Only one optical surface is generated or intended for use. Only paraboloid surfaces are made.

My apparatus is not restricted to paraboloid surfaces and may produce more than one optical surface on a material. Further, in one embodiment, the material to be formed does not, itself, rotate. Coatings can be deposited on intermediate surfaces in my invention.

In another embodiment of my invention, differential pressure on a membrane can be employed as part of the means to form the surface. The nature of the fluid materials making direct contact has not been explored for its effects on the surfaces generated. This invention points out the importance of the relative viscosities of the materials. Finally, finishing procedures could be carried out in the same vessel in which the reaction takes place, as for example, inserting an abrasive slurry between the surface generated.

The theoretical basis for my invention can best be described by considering the geometry of three basic curves-the parabola, the hyperbola, and the circle. In spinning, the formation of a parabola is due to the interaction of centrifugal and gravitational forces. While the general equation of the parabola is $$Y = aX^2 + bX + C \tag{1}$$

the parabola is generated in spinning by the equation:

$$G = F \cdot C \tag{2}$$

where $G$ is the gravitational attraction, $F$ is the centrifugal force and $C$ is a constant including the density of the material spun.

The hyperbola is generated mathematically by several equations including:

$$XY = C \tag{3}$$

This can be achieved in spinning by rotating the axis of rotation to a 45° angle. Under these conditions the centrifugal force, F, can be divided into two vectors $Fx$ and $Fy$, the respective vertical and horizontal components of the centrifugal force. Rewritting the general equation and substituting we have:

$$Y = C/X \text{ and} \tag{4}$$

$$Fx = C/Fy \tag{5}$$

In equation 5, the term $Fx$ will be equal to the horizontal vector component of the centrifugal force and term $Fy$ will refer to the corresponding vertical forces, the actual vertical vector component of the centrifugal force (fy) minus the constant force of gravity (g):

$$Fy = fy - g \tag{6}$$

Thus, in the physical embodiment of the hyperbola, if the distances of the surface from the axes are generated by the forces due to spinning, the curve generated by the equation (5) will be that of a hyperbola which means that the difference between the distances (or forces) to the foci from any point will be constant.

The third general case of a family of curves of importance is the circle and the sphere, one of its three dimensional analogs. When a vessel is simultaneously rotated around two axes that are perpendicular to each other and, perferably, both are at a 45° angle to the vertical, while the foci in the concave faces of the curves coincide, the resultant curve is a sphere. The angle with the vertical is not critical and elipsoids can also be generated by varing the focal lengths. The curves formed result from the vectors of the forces generated. They can be mathematically derived from the preceeding discussion.

Several familiar shapes can be used as reaction vessels including cylinders; cones, single or double with base to base; and spheres.

Figure 4:
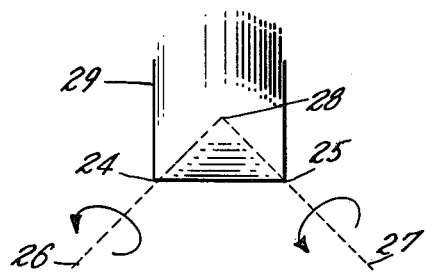

FIG. 4 illustrates a special vessel designed to form a spherical surface under special conditions.

Figure 5:
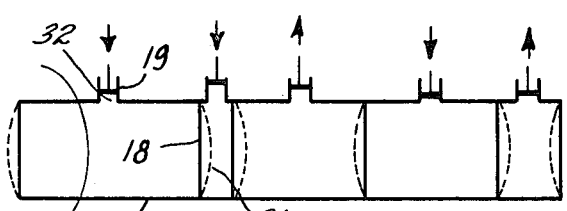

FIG. 5 represents a modified cylinder designed to contain several elements which can be shaped, preliminarily, by variations in pressures on the membranes separating the elements.

DETAILED DESCRIPTION OF THE DRAWINGS.

Figure 1:
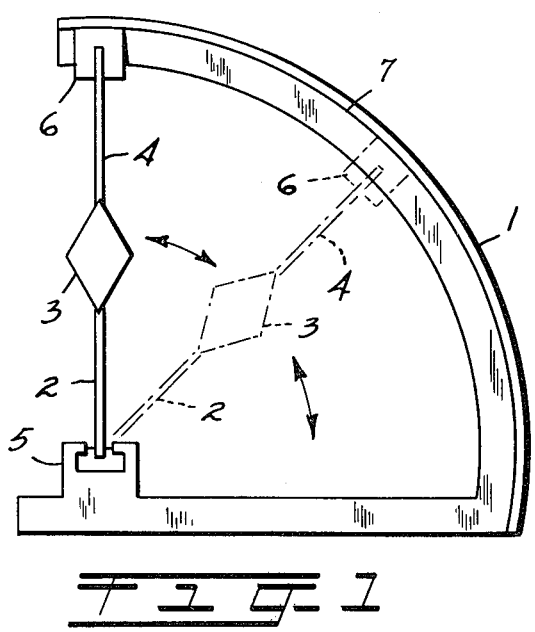
FIG. 1 is an embodiment of my invention having one axis of rotation in which the angle of rotation is adjustable.

FIG. 1 comprises a support frame 1 on which is mounted a supporting member 2 anchoring the reaction vessel 3 which is suspended by another supporting member 4 which is attached to the frame 1. Inasmuch as material can be spun faster if it is off-center, but the axis should not be off-center for accuracy of the surfaces formed, centering and eccentricity are controlled at the base of the lower support member 5. At the top of the upper support member 6 a means is provided for driving and control of eccentricity. The driving means could use gears or belts driven off a motor that need not be directly attached to the apparatus. In fact, if the motor is mounted separately and drives through a coaxial cable, its vibrations will cause minimal distortion of the surfaces formed. The angle of the reaction vessel's axis of rotation is determined by the position of the upper control 6 on the track 7 in the frame. When the supporting members 2 and 4 hold the reaction chamber in the vertical position paraboloid lenses will be formed by rotation. Several surfaces can be formed either sequentially, after solidification of each layer, or by use of several immisable layers. In the same manner, when the reaction vessel 3 and support members 2 and 4 are at a 45° angle, hyperboloid surfaces can be formed in the same manner. A conic reaction vessel 3 is best for hyperboloid surface formation while a cylindrical chamber for the reaction vessel 3 would be best for paraboloid lenses.

Figure 2:
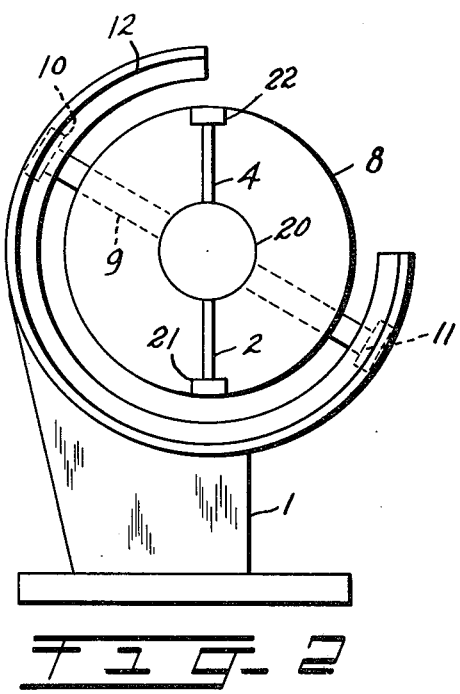
FIG. 2 is a modification of FIG. 1. In this embodiment two axes of rotation, each of which is adjustable, are employed.

FIG. 2 comprises a support frame 1, support members 2, 4 supporting a reaction vessel 3a and having eccentricity control 5a and centerable driving means 6a. The driving means 6a and eccentricity control 5a and support members 2 and 4 are mounted on circular frame 8 which in turn is mounted on a frame 9 which is eccentrically controlled 10 and rotated by a centerable driving means 11 and mounted on the support frame 1, while being rotatable on a track of circular curvature 12. when the frame 9 is at a 45° angle and support members 2 and 4 are at a 45° angle, and perpendicular to frame 9, their axes intersecting at their midpoints within the reaction vessel, material in the reaction vessel can be rotated on two axes simultaneously. If the rotations are equal, a sphere will be formed, if the rotations are unequal, an ellipsoid will form.

Figure 3:
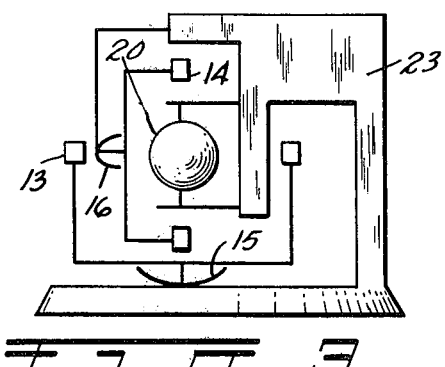
FIG. 3 is an embodiment of my invention which employs magnets as the spinning force when the material being spun is responsive to a magnetic field.

FIG. 3 shows an apparatus including a stationary reaction vessel 3a and a plurality of rotating magnets, in FIG. 3 comprising of a pair of horizontally rotating magnets 13 and a pair of vertically rotating magnets 14.

FIG. 4 is a vessel, designed to minimize turbulance in rotations involving a plurality of axes, formed by the confluence of two cones, each of an apex angle of at least 90°, the midlines to the apices intersecting within the described vessel at a 90° angle, the sides rising to form a vertical section of circular cross-section. This vessel is designed to form a spheroid surface by generating two hyperbolas at 90° from each other, within a surface, and each at 45° from the vertical, with the different focal points and the intersection of the axes of rotation coinciding.

FIG. 5 comprises a cylinder or rigid housing 17 divided into compartments 30 or elements by a set of flexible membranes 18, the individual element comprising a section of the housing with at least one side open, the opening closed by a flexible membrane, usually thin, stretched across the circumference of the opening, the membrane itself either flexible metal or elastic or plastic material, either opaque, translucent, or, especially if it is to remain as part of the product, transparent, with or without a reflective or anti-reflective coating, each compartment having a piston controlled pressure regulating port 19. When the pressures have been properly adjusted in each element, the unit can be inserted in a spinning apparatus to further modify the elements. The membranes 18 can respond to the spinning by stretching in the direction dictated by the forces produced 31. If the cylinder is of known volume and the parts are of known, uniform, diameter, the shape of the elements 31 can in part be monitored by the size of the port plug 32, while the plug also serves as a permanent guide in the finished product to the original settings.

A DETAILED DESCRIPTION OF THE INVENTION

In the light of my drawings, what I have invented is a new apparatus and method for the spinning of one or more curved surfaces on a fluid material, wherein the type of curve and its exact curvature are under the control of the operator.

Thermoplastic materials, including glasses, or thermosetting materials having suitable working temperature ranges may be used, depending on the heat control device used. The reaction vessel 3 would be filled with the material to be formed, usually one or more immiscible liquids, usually completely filling the chamber, and then the chamber would be sealed. The eccentricity would be set at a high value. The rotation would begin and slowly build up. The eccentricity would be reduced as the rotation increased until at the desired rate of revolution, the eccentricity would be reduced to the desired, minimal value. This stabilized environment is maintained while the material in the reaction vessel is being modified to the desired degree, probably including solidification of part or all the material from its original, molten state.

While air has been used as the non-solidifying fluid in prior art, it has been found that materials of greater viscosity tend to dampen the turbulence found in spinning processes and therefore produce surfaces with minimal distortion. For the purpose of surface formation, the contiguous layers should be immiscible, of slightly different densities and, where a layer is not intended to be retained, should have solidification conditions outside the operating range. An elastic membrane may be employed if mounted to conform to the boundary conditions of the surface to be formed on its surface.

Coatings may be applied to the surfaces of the various layers, if two or more adjacent layers are organic or inorganic electrolytes, or if the proper chemical reactions can occur in a layer or adjacent layers. During formation of the elements, the coatings may be formed before or after the solidification of one or more of the layers, depending on the necessary chemistry. Alternatively, if a membrane is used, a surface of the membrane can be pre-coated: as is known in the art. The rotation can be stopped and the reaction vessel opened and the contents removed. Further modifications of the product may be carried out after inspection of same, such as deposition of additional layers.

After formation of the material, possible roughnesses in the formed surface may be eliminated by introducing an abrasive slurry of some known composition between the surfaces of the materials in the reaction vessel or its equivalent, permitting the adjacent surfaces to abrade each other by the rotation of either or both of the surfaces and/or by the rotation of the reaction vessel or equivalent.

The specific curve types formable under these conditions include paraboloid, hyperboloid, and spheric sections. In FIG. 1, with support members 2 and 4 in the vertical position, rotation of the reaction vessel 3 about its axis will generate a paraboloid, as is known. Tilt the angle of the axis to 45° as in the phantom of FIG. 1, and you can generate hyperboloid surfaces. The use of two axes of rotation permits the formation of spheric surfaces as in FIG. 2, where direct rotation of the support members 2 and 4 within a circular frame 8 is combined with rotation of the circular frame 8 by the rotatable frame 9 which is mounted on a fixed, supporting frame 1. The rotation about the axis formed by support members 2 and 4 will drive the fluid and therefore the fluid surface away from the axis and up along the opposite wall of the reaction chamber. The rotation of frame 9 will drive the fluid and therefore the fluid surface away from the axis of rotation (Frame 9 and up along the wall opposite this axis. The material will thereby be distributed in two planes at once and will respond to the combined forces.

If the forces are of equal magnitude and perpendicular to one another, the forces will tend to form a spherical surface.

Several modifications are envisioned in the operation of my invention. The means of rotating the fluid material in the reaction vessel could be a rotating external field to which the material to be rotated is responsive; for example, a magnetic field. FIG. 3 shows two pairs of magnets, 13 and 14 rotatable on axes which may be perpendicular to one another.

The reaction vessel can take several shapes. A cylindrical vessel (see FIG. 5) is known to be good for generating paraboloids. In the light of the assymtotic character of hyperboloids, a conic vessel would be good for generating hyperboloids, either a single conic section or two cones with contiguous bases, as illustrated in the reaction vessel 3 of FIG. 1.

Spheric surfaces can be generated in spheres (see the reaction vessel 3 in FIG. 2). Spheric sections can also be generated in a vessel illustrated in FIG. 4 wherein the base is a pair of cones overlapping and rising to form a cylinder. In such a vessel spheric surfaces could be formed and paraboloid an hyperboloid surfaces could be formed above such surfaces, after the solidification of the material forming the spheric surface.

A pretreatment is possible in forming compound lenses requiring a plurality of elements, where membranes are used in forming the boundaries between elements. Ports 19 may be fitted to each element, the port having a piston whose movement can change the relative curvature of the various surfaces 18 by changing the volume and pressure in each particular element. The modified series of elements with the various pistons in the ports locked stationary can then be rotated.

A specific embodiment of my invention could follow the form of FIG. 2. A rigid support frame 1 forms a circular track 12 on which a frame 9 is mounted at 10 and 11 with bearings and a locking device so that it won't slip after being positioned. The frame 9 can be centered on the driving axis between 10 and 11 by the eccentricity control 10 and the centerable driving means 11. The simplest form of centering would be a set of stops on the mounts 10 and 11, one dead center and the others off-centered. A circular frame 8 is rigidly attached to the frame 9. Support members 2 and 4 are attached to frame 8 at driving means 6 and eccentricity control 5 in the same manner that eccentricity control 10 and centerable driving means 11 connect Frame 9 to circular tract 12. Power may be brought to driving means 6 via a coaxial cable along Frame 8 from its connection to Frame 9. Reaction vessel 3 connected to support members 2 and 4 and nested at the dynamic center of the apparatus could be filled with several immiscible layers (in this embodiment 3 immiscible liquids). If the densest layer has the lowest melting point, the second layer has a higher melting point and the last layer of lowest density has the highest melting point, then an element can be formed of one, two, or three layers: Rotation at temperatures above the melting point of the layer of highest melting point would prevent solidification. As the temperature falls, the center, middle, and finally outer most layer would solidify. The temperature at which the work is removed would determine the number of layers and the nature of the rotation at the different temperature ranges will determine the curvature of each layer.

The compartmented reaction vessel illustrated in FIG. 5, operates as follows: All the chambers of the reaction vessel 17 are filled so that the flexible membranes 18 are flat and the pistons in the ports 19 are uniformly positioned. By moving the pistons, the shape of the membranes is changed. Pushing in on the piston in the first port 19 causes its two flexible membranes 18 to distend outward (dashed lines), pressure on the next piston causing its distal membrane to bulge outward, pulling on the piston in the third chamber draws the two flexible membranes of this compartment inward, pressure on the piston in the fourth port drives its flexible membranes outward and the vacuum in the fifth chamber due to pulling on the piston in the fifth port draws the flexible membranes of the last chamber inward.

It is to be understood that the above described apparatus for and method of making lenses and lenses made thereby are illustrative of the principles of the invention. Other such arrangements can be devised by one skilled in the art without departing from the spirit and scope of the invention. For example: compound lenses composed of several elements could be formed by forming the various layers one at a time, rather than all at once; thereby, the particular conoid surfaces of each layer could be varied, one from another. Also, the availability of refractory lenses containing multiple paraboloid and hyperboloid surfaces shall expand the realm of the lens makers art, the availability of spheres of known curvature and composed of several spheres one contained within another, likewise shall extend the lens makers art. The use of this invention in non-optical fields such as forming of magnetic fields, will be apparent to those skilled in the art, also.

What I claim is:

1. An apparatus for forming curved surfaces, wherein the material being formed is responsive to magnetic fields, comprising:
    a frame,
    a vessel rigidly attached to the frame,
    a track of circular section attached to the frame,
    a pair of rotatable magnets attached to the track,
    means of moving each of the pair of magnets along the track attached between the magnets and the track, and
    means of rotating each of the magnets around the vessel attached between each of the magnets and the track,
    whereby a magnetically responsive material may be rotated in a plane by the rotation of the pair of magnets.

2. The apparatus of claim 1, further comprising:
    a second track of circular section attached to the frame,
    a second pair of rotatable magnets attached to the second track,
    means of moving the second pair of magnets along the second track attached between the second pair of rotatable magnets and the second track, and
    means of rotating the second pair of magnets around the reaction vessel attached between the second pair of magnets and the second track, whereby the material may be rotated in two planes simultaneously by the simultaneous rotation of the two pairs of magnets.

3. An apparatus for forming curved surfaces on material, comprising:
a support frame forming a supporting track of circular section,
means to control eccentricity of a vessel attached to the track,
an upper supporting member attached to the eccentricity control means,
a vessel attached to the supporting member,
a lower supporting member attached to the vessel,
means of controlling eccentricity and centering of the vessel attached to the support frame and to a lower end of the roller supporting member,
means of driving support members attached to the upper support member and to the track,
the support frame attached to a rigid supporter frame,
an upper end of the rigid frame attached to a supportive track of circular section,
a means of driving the rigid frame attached to the supportive track and driving the upper end of the rigid frame,
the roller end of the rigid frame attached to the supportive track,
an eccentricity control connected to the lower end of the rigid frame and to the supportive track, whereby the support frame may be located about the axis of the rigid frame, while the rigid frame is positioned on the supportive track, thereby forming spherical or ellipsoid surfaces,
said vessel formed, at least in part, like two cones, each of at least 90° apical angle whose median axes are at a 90° angle to each other and intersect along the mid line of the reaction vessel forming a cylindrical upper section.

4. An apparatus for forming curved surfaces on material, comprising:
a support frame forming a supporting track of circular section,
means to control eccentricity of a vessel attached to the track,
an upper supporting member attached to the eccentricity control means,
a vessel attached to the supporting member,
a lower supporting member attached to the vessel,
means of controlling eccentricity and centering of the vessel attached to the support frame and to a lower end of the roller supporting member,
means of driving support members attached to the upper support member and to the track,
the support frame attached to a rigid supporter frame,
an upper end of the rigid frame attached to a supportive track of circular section,
a means of driving the rigid frame attached to the supportive track and driving the upper end of the rigid frame,
the roller end of the rigid frame attached to the supportive track,
an eccentricity control connected to the lower end of the rigid frame and to the supportive track, whereby the support frame may be located about the axis of the rigid frame, while the rigid frame is positioned on the supportive track, thereby forming spherical or ellipsoid surfaces, and
the vessel comprising a flexible ended vessel.

5. The apparatus of claim 4, wherein the flexible ended vessel comprises:
a cylinder, forming an open end,
a flexible membrane closing the open end,
the cylinder forming an opening in the wall of the cylinder,
a port mounted in the opening in the wall of the cylinder,
means of filling a compartment formed interiorly by the cylinder, and
a pressure regulating piston slidingly movable in the port and fixedly positionable in the port, whereby a curvature of the flexible membrane may be determined, changes, and measured.

6. The vessel of claim 5, wherein the membrane is a coated membrane.

7. An apparatus for forming curved surfaces on material, comprising:
a support frame forming a supporting track of circular section,
means to control eccentricity of a vessel attached to the track,
an upper supporting member attached to the eccentricity control means,
a vessel attached to the supporting member,
a lower supporting member attached to the vessel,
means of controlling eccentricity and centering of the vessel attached to the support frame and to a lower end of the roller supporting member,
means of driving the support members attached to the upper support member and to the track, and
rotation of the support members when the axis of rotation is set at an angle of 45° to form a hyperboloid surface.

8. An apparatus for forming curved surfaces on material, comprising:
a support frame forming a supporting track of circular section,
means to control eccentricity of a vessel attached to the track,
an upper supporting member attached to the eccentricity control means,
a vessel attached to the supporting member,
a lower supporting member attached to the vessel,
means of controlling eccentricity and centering of the vessel attached to the support frame and to a lower end of the roller supporting member,
means of driving support members attached to the upper support member and to the track,
the support frame attached to a rigid supporter frame,
an upper end of the rigid frame attached to a supportive track of circular section,
a means of driving the rigid frame attached to the supportive track and driving the upper end of the rigid frame,
the roller end of the rigid frame attached to the supportive track, and
an eccentricity control connected to the lower end of the rigid frame and to the supportive track, whereby the support frame may be located about the axis of the rigid frame, while the rigid frame is positioned on the supportive track, thereby forming spherical or ellipsoid surfaces.

* * * * *